United States Patent [19]

Propster et al.

[11] 4,441,906
[45] Apr. 10, 1984

[54] METHOD OF PREHEATING GLASS BATCH

[75] Inventors: Mark A. Propster, Gahanna; Stephen Seng, Bladensburg; Charles M. Hohman, Granville, all of Ohio

[73] Assignee: Owens-Corning Fiberglas Corporation, Toledo, Ohio

[21] Appl. No.: 437,243

[22] Filed: Oct. 28, 1982

[51] Int. Cl.³ .............................................. C03B 1/00
[52] U.S. Cl. ........................................ 65/27; 65/134; 65/335; 65/356; 165/1; 165/88; 165/111
[58] Field of Search ................. 65/136, 137, 346, 356, 65/27, 134, 335; 165/1, 88, 111

[56] References Cited
U.S. PATENT DOCUMENTS

| 4,319,903 | 3/1982 | Hohman | 65/27 |
| 4,338,113 | 7/1982 | Hohman et al. | 65/134 X |
| 4,349,367 | 9/1982 | Krumwiede | 65/27 |
| 4,401,453 | 8/1983 | Propster et al. | 65/27 |

FOREIGN PATENT DOCUMENTS 464540  6/1975  U.S.S.R. ............................ 65/337

Primary Examiner—Arthur D. Kellogg
Attorney, Agent, or Firm—Ronald C. Hudgens; Patrick P. Pacella

[57] ABSTRACT

A method for preheating glass batch is disclosed. Media heated with furnace exhaust gases is used to preheat the glass batch. This invention includes a way to clean furnace exhaust gas condensate from the surface of the media.

10 Claims, 2 Drawing Figures

METHOD OF PREHEATING GLASS BATCH

TECHNICAL FIELD

This invention relates to a process for preheating glass batch which is then fed to a glass-melting furnace.

BACKGROUND ART

One method for preheating glass batch involves feeding cold particulate glass batch raw materials into one end of a rotating heat-transfer drum and feeding hot media of larger particle size than the batch particles into the other end of the heat transfer drum. The glass batch moves in direct and immediate physical contact with the heated media, with the batch flowing from the cold end to the hot end of the drum and the media flowing from the hot end to the cold end of the drum. The heated particulate batch is removed from the hot end of the drum, and the cooled media is removed from the cold end of the drum. Preferably, the heat transfer media is made of a durable material such as ceramic material, steel, stainless steel, aluminum, or gravel. The media can be spherical in shape, and a useable example of such media is spherical ceramic balls. The media can be heated with an external burner or preferably heated by direct contact with exhaust gases from a glass melting furnace.

When the media is heated with furnace exhaust gases, a condensate often collects on the surface of the media. This condensate usually is cleaned off or removed when the media is tumbled with the batch in the rotating drum. Frequently, however, tumbling the media does not remove all the condensate either because the dwell time in the drum is too short or because the coating of condensate is too heavy.

DISCLOSURE OF INVENTION

According to this invention, we have developed a method for cleaning the condensate from the surface of the media. The key to our invention is to heat the media to a temperature that will melt the condensate from the media surface. The media is heated to a temperature where the condensate is very fluid and will flow away from the media. The fluid condensate may be collected and the cleaned media may be fed directly to the preheating container. Typically, the media is heated to a temperature ranging from 1700° to 1900° F. If the cleaned media is so hot that it will melt batch in the preheating container, cooling will be necessary before the media is brought in contact with the batch.

BEST MODE OF CARRYING OUT INVENTION

Our invention includes durable heat transfer media formed of ceramic, steel, stainless steel, aluminum, gravel or the like which are positioned in a preheat hopper and preheated, preferably by exhaust gases from a glass making furnace.

The heated media is then introduced into one end of a container, such as a cylindrical drum, rotatable on an inclined axis. Concurrently, glass batch to be heated is introduced into the other end of the drum. The hot media flows in one general overall direction through the drum, and the batch flows in a generally opposite direction through the drum. The media serves to heat the batch, and the batch serves to cool the media. The cooled media is recycled back to the preheat hopper; the preheated batch is fed to the furnace batch feed mechanism.

While the condensate may be melted from the surface of the media before the media is recycled back to the preheat hopper, we prefer to remove the condensate between the preheat hopper and cylindrical drum as shown in the Figures. An external burner or furnace exhaust gases may be employed to melt the condensate from the media, with the external burned being preferred.

Figure 1:
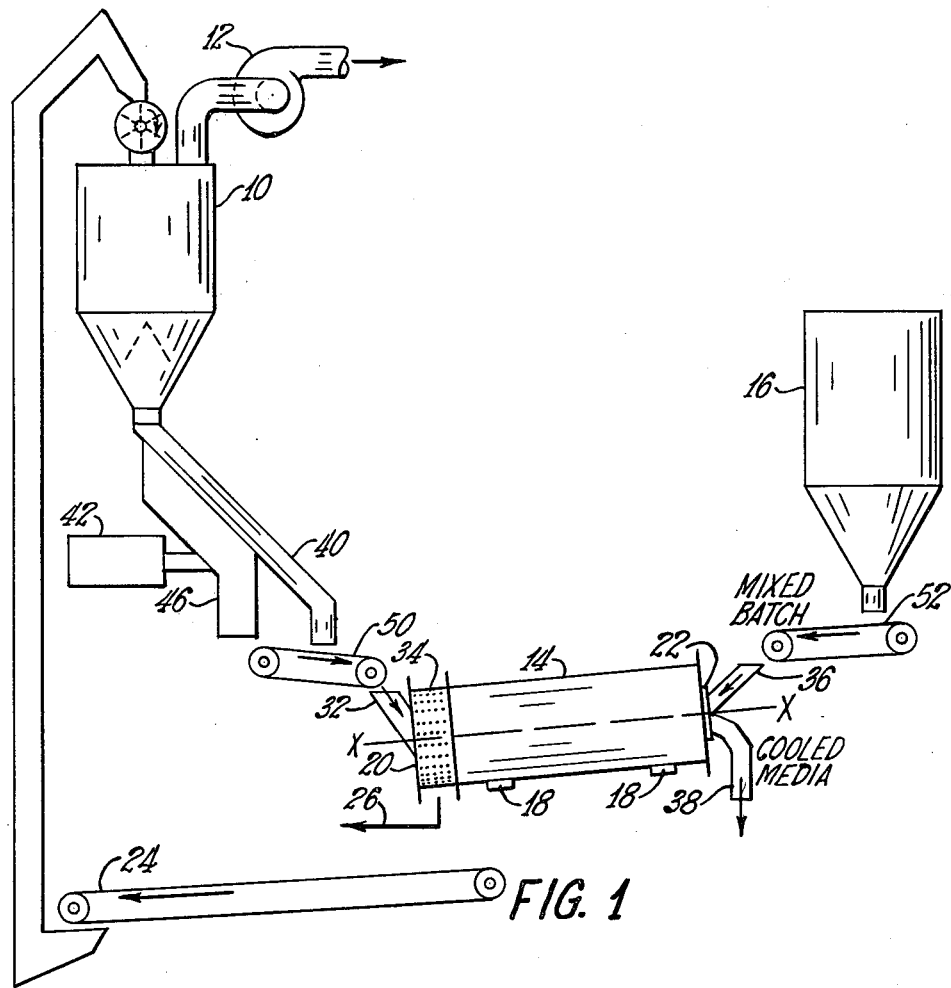
FIG. 1 is a flow diagram of this invention including a means for melting the condensate from the surface of the media.

In FIG. 1, heat transfer media may be heated with flue gases at a temperature normally ranging from 482° to 677° C. from a glass melting furnace (not shown) in preheat hopper 10. The flue gases are introduced into the lower part of preheat hopper 10, and the media is introduced into the upper part of preheat hopper 10. The flow gases and media are countercurrent to each other. The media exits through the bottom of preheat hopper 10, and the flue gases exit through the top of preheat hopper 10. A blower or fan 12 is shown to pull the exhaust gases from preheat hopper 10 or to maintain a negative pressure in the hopper. The media may be heated to temperature at or near the temperature of the flue gases.

The hot media then is fed to one end of heat exchange drum 14 by a conveyor 50. Concurrently, particulate glass batch raw materials are fed by conveyor 52 and a screw feeder (not shown) from mixed batch storage 16 to the other end of drum 14. Drum 14 is rotated around the axis x—x by a motor and drive (not shown).

Centrally arranged stationary end parts 20 and 22 form inlet and outlet conduits communicating with the inside of the drum. The cooled media is discharged from the drum via conduit 38. After the media is discharged from drum 14 via conduit 38, it is returned to preheat hopper 10 via conveyor 24.

Hot mixed batch from drum 14 is fed to a glass melting furnace via stream 26.

Hot media is fed to drum 14 through conduit 32, and hot batch is discharged through screen 34. Cold batch is fed through conduit 36, and cold media is discharged through conduit 38. The rotation of the drum and baffles (not shown) cause the media and batch to tumble in direct immediate physical contact with each other.

Cylindrical container 14 is inclined at an angle. In the preferred embodiment, the batch charging end of the container is elevated above the media charging end. While the angle can vary widely, generally the drum will form an acute angle with a horizontal line no greater than about 45° and typically less than 15°. Preferably, the angle is less than 5°.

While the tumbling of the media and batch occurs through agitation from the baffles and rotation of the drum, movement of the batch and media through the drum is believed to occur in the following manner. The media and batch form gradients in the drum and generally flow downhill in a direction along the gradients and in opposite directions. The batch and media tumble and move over each other as they flow from the one end of the drum to the other.

Figure 2:
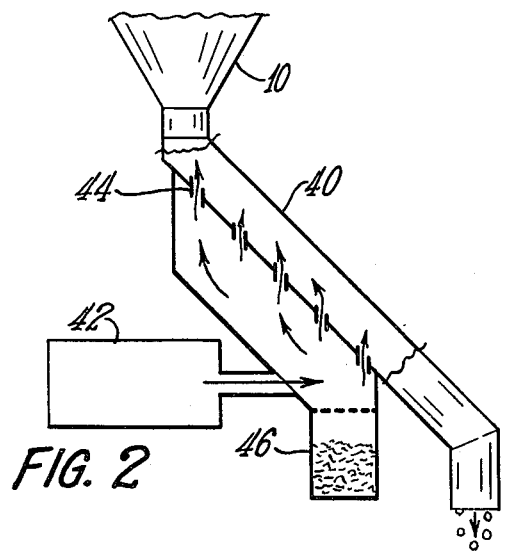
FIG. 2 shows the means for melting the condensate from the media in more detail.

FIG. 2 shows the means for melting the condensate from the media in more detail. in the best mode of this invention, the "dirty" media is cleaned as it exits preheat hopper 10. As the media moves through conduit 40, they come in contact with gases from burner 42. The gases enter conduit 40 through openings 44. The flow of gases and media are countercurrent to each other with the gases being hot enough to melt any condensate from the media. The molten condensate typically flows through openings 44 and is collected in slag box 46. Openings 44 are smaller than the media and prevent their passing therethrough.

The temperatures of the gases are such that the viscosity of the removed condensate permits downward flow of the liquid material to a collection point. The cleaning may be done continuously but typically is run periodically whenever the condensate builds up on the media. In one embodiment, furnace exhaust gases may be employed in place of the gases from burner 42. In either case, it may be necessary to cool the media before they enter drum 14. One way of doing this is to bypass the hot media to recycle elevator 24. Another way to cool the cleaned media would be to run them through drum 14 without the addition of batch to the drum. Still another way would be to cool the cleaned, hot media from conduit 40 with dilution air before they are charged to drum 14. This step would be required if the media are at a temperature that would melt the batch in drum 14.

INDUSTRIAL APPLICABILITY

Example I

Trials were conducted with media spherical in shape and closely matched in diameter to prevent batch and media flow problems. Preferably, the media will have a shape factor ranging between 0.9 and 1.0. The media, if closely matched, could have a wide diameter range, but the optimum size should be approximately one inch in diameter.

Hot trials have been carried out with media heated to 427° C. The media, in turn, heated the batch to a temperature of 388° C. for a heat transfer efficiency over 90%. With this invention, we expect to be able to heat glass batch to a temperperature of 649° C. Any glass batch can be preheated with bottle or container glass, flat glass and fiber glass batches being the most common.

The batch formulation used was a standard wool glass batch composition. Textile batch, however, also can be preheated.

A typical wool glass batch is:

| Ingredient | Weight Percent |
| --- | --- |
| Central Silica Sand | 40.96 |
| 5 Mol Borax | 10.77 |
| Burnt Dolomite | 4.68 |
| Soda Ash | 14.71 |
| Barytes | 3.02 |
| Nepheline Syenite | 11.85 |
| Spore Limestone | 7.94 |
| Carbon | 0.05 |
| Cullet | 6.00 |

The hot wool glass batch then can be fed to a glass melting furnace.

Example II

In one run, ceramic balls approximately one inch in diameter were exposed to furnace exhaust gases for 100 hours. The glass melted in the furnace was a typical wool glass batch such as that described in Example I. The gases had an inlet temperature of about 650° C.

The "dirty" balls then were cleaned with gases from a burner according to this invention. The gases had a temperature of about 1800° F. The removed condensate or slag fluid collected in the slag box had an initial temperature of less than 1500° F. The "dirty" balls were cleaned of essentially all condensate in about ten (10) minutes. Residence time in conduit 40 should be greater than this level, i.e., greater than 10 minutes. The slag may be used as collected, discarded or fed directly to the glass melting furnace.

We claim:

1. A process for producing glass by charging to a melting furnace and melting therein a particulate glass batch, including the steps of:
   heating the durable heat transfer media, larger in particle size than the glass batch, by direct contact with exhaust gases from the melting furnace wherein the direct contact with furnace gases coats the media with a condensate;
   heating the glass batch by direct contact with the hot media; and
   cleaning the media by heating them to a temperature that will melt the condensate from the media.

2. A process for producing glass by charging to a melting furnace and melting therein a particulate glass batch, including the steps of:
   heating the durable heat transfer media, larger in particle size than the glass batch, by direct contact with exhaust gases from the melting furnace wherein the direct contact with furnace gases coats the media with a condensate;
   heating the glass batch by direct contact with the hot media; and
   removing the condensate from the media by heating them to a temperature wherein the condensate is very fluid and will flow away from the media.

3. A process for producing glass by charging to a melting furnace and melting therein a particulate glass batch, including the steps of:
   (a) heating the durable heat transfer media, larger in particle size than the glass batch, by direct contact with exhaust gases from the melting furnace wherein the direct contact with furnace gases coats the media with a condensate;
   (b) heating the glass batch by direct contact with the hot media; and
   (c) removing the condensate from the media by heating them to a temperature such that the viscosity of the removed condensate permits downward of the condensate flow in a fluid state away from the media.

4. A process according to claim 3 wherein the glass batch in step (b) is heated by
   (i) introducing the hot media into one end of an inclined heat transfer container rotatable about an axis having the same inclination as the container;
   (ii) introducing the particulate glass batch into the other end of container;
   (iii) rotating the container, during rotation the batch and media tumbling and moving over each other in heat transfer relationship; and
   (iv) moving the glass batch in one direction through the rotating container for discharge and moving the hot media in the opposite direction for discharge at the other end.

5. A process according to claim 3 wherein the media is ceramic balls and the heating of step (c) is carried out at a temperature ranging from 1700° to 1900° F.

6. A process according to claim 5 wherein the temperature is 1800° F.

7. A process according to claim 3 wherein the heating of step (c) is carried out by bringing the media in direct contact with hot gases from a burner.

8. A process according to claim 3 wherein the heating of step (c) is carried out by bringing the media in direct contact with furnace exhaust gases.

9. A process according to claim 7 wherein the gases and media in step (c) flow in a manner that are counter-current to each other.

10. A process according to claim 3 wherein the heating of step (c) is carried out after the heating of step (a) and prior to the heating of step (b).

* * * * *